US012444428B2

(12) United States Patent
Gaultier et al.

(10) Patent No.: US 12,444,428 B2
(45) Date of Patent: Oct. 14, 2025

(54) METHOD AND DEVICE FOR VARIABLE PITCH ECHO CANCELLATION

(71) Applicant: Orange, Issy-les-Moulineaux (FR)

(72) Inventors: Clément Gaultier, Chatillon (FR); Alexandre Guerin, Chatillon (FR); Marc Emerit, Chatillon (FR); Grégory Pallone, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 267 days.

(21) Appl. No.: 18/249,225

(22) PCT Filed: Sep. 27, 2021

(86) PCT No.: PCT/FR2021/051659
§ 371 (c)(1),
(2) Date: Apr. 14, 2023

(87) PCT Pub. No.: WO2022/079365
PCT Pub. Date: Apr. 21, 2022

(65) Prior Publication Data

US 2023/0395090 A1 Dec. 7, 2023

(30) Foreign Application Priority Data

Oct. 15, 2020 (FR) ....................................... 2010570

(51) Int. Cl.
*G10L 21/0224* (2013.01)
*G10L 21/0232* (2013.01)
(Continued)

(52) U.S. Cl.
CPC ...... *G10L 21/0224* (2013.01); *G10L 21/0232* (2013.01); *G10L 21/0264* (2013.01); *G10L 2021/02082* (2013.01)

(58) Field of Classification Search
CPC ............. G10L 21/0224; G10L 21/0232; G10L 21/0264; G10L 2021/02082
See application file for complete search history.

(56) References Cited

U.S. PATENT DOCUMENTS 6,798,754 B1 * 9/2004 Farhang-Boroujeny .................... H04M 9/082 370/286
7,310,425 B1 * 12/2007 Benesty ................ H04M 9/082 381/71.11
(Continued)

OTHER PUBLICATIONS

Panda, "A Low Complexity delayless frequency domain feedback canceller for hearing aids", 2015, 2015 IEEE International Symposium on Signal Processing and Information Technology (ISSPIT) (Year: 2015).*
(Continued)

*Primary Examiner* — Raymond S Dean
(74) *Attorney, Agent, or Firm* — Knobbe, Martens, Olson & Bear, LLP

(57) ABSTRACT

The processing of a signal y(t) coming from a microphone of an equipment item including a loudspeaker intended to be supplied a signal x(t), limits an echo effect induced by the microphone capturing a sound emitted by the loudspeaker. This sound and any of its acoustic reflections follow an acoustic path w from the loudspeaker to the microphone. To limit the echo effect, the processing includes determining ŝ(t) a useful signal s(t) by subtracting from the signal y(t) an estimate of an echo signal x(t)*ŵ(t) given by applying a filter ŵ(t) to the signal x(t). The filter ŵ(t) is adaptive by variable step size to account for a change over time in the acoustic path w(t). The adaptive filter ŵ(t) is produced at each frame k of samples as a function of an update $\Delta W^{(k)}$ to
(Continued)

the acoustic path w for this frame k and by applying a normalization Λ satisfying a criterion chosen for minimal variance.

19 Claims, 4 Drawing Sheets

(51) Int. Cl.
*G10L 21/0264* (2013.01)
*G10L 21/0208* (2013.01)

(56) References Cited

U.S. PATENT DOCUMENTS

2007/0019803 A1* 1/2007 Merks .................. H04M 9/082 379/406.08
2018/0063651 A1* 3/2018 Nakagawa ....... G10K 11/17854

OTHER PUBLICATIONS

Paez Borrallo, Jose M. et al., "On the implementation of a partitioned block frequency domain adaptive filter (PBFDAF) for long acoustic echo cancellation", Signal Processing, Elsevier Science Publishers B.V. Amsterdam, NL, vol. 27, No. 3, Jun. 1, 1992, pp. 301-315.
Trump, T. "A frequency domain adaptive algorithm for colored measurement noise environment", Acoustics, Speech and Signal Processing, 1998. Proceedings of the 1998 IEEE International Conference on Seattle, WA, USA May 12-15, 1998, New York, NY, USA, IEEE, US, vol. 3, May 12, 1998, pp. 1705-1708.
Jung, H. K. et al., "A new double-talk detector using echo path estimation", Speech Communication, vol. 45, No. 1, 2005, pp. 41-48.
Toon Van Waterschoot et al., "Double-Talk-Robust Prediction Error Identification Algorithms for Acoustic Echo Cancellation", IEEE Transactions on Signal Processing, IEEE Service Center, New York, NY, US, vol. 55, No. 3, Mar. 1, 2007, pp. 846-858.
J.M. Gil-Cacho et al., "A frequency-domain adaptive filter (FDAF) prediction error method (PEM) framework for double-talk-robust acoustic echo cancellation", IEEE/ACM Transactions on Audio, Speech, and Language Processing, vol. 22, No. 12, pp. 2074-2086.
Gaultier, Clement et al., "Double-Talk Robust Acoustic Echo Cancellation Using Partition Block Frequency-Domain Adaptive Filtering", 2021 29th European Signal Processing Conference (EUSIPCO), Aug. 23, 2021, pp. 171-175.
International Search Report for International Application No. PCT/FR2021/051659 mailed on Jan. 18, 2022.

* cited by examiner

METHOD AND DEVICE FOR VARIABLE PITCH ECHO CANCELLATION

INCORPORATION BY REFERENCE TO ANY PRIORITY APPLICATIONS

This application is filed under 35 U.S.C. § 371 as the U.S. National Phase of Application No. PCT/FR2021/051659 entitled "METHOD AND DEVICE FOR VARIABLE PITCH ECHO CANCELLATION" and filed Sep. 27, 2021, and which claims priority to FR 2010570 filed Oct. 15, 2020, each of which is incorporated by reference in its entirety.

BACKGROUND

Field

This description relates to a method and a device for echo cancellation.

Description of Related Art

In the context of simultaneous sound capture and playback, it is appropriate to use processing involving acoustic echo cancellation (or "AEC" hereinafter).

As shown in FIG. 1, an equipment item comprises at least one loudspeaker HP and at least one microphone MIC capturing a microphone signal y(t). The loudspeaker HP is supplied a signal x(t) which, when emitted by the loudspeaker HP, is transformed by the environment (possible reverberations, Larsen effect, or others) and is captured by the microphone along with a useful signal s(t) currently being acquired by the microphone MIC. The microphone signal y(t) is thus composed of:

- the useful signal s(t) (possibly concerning speech signal data from a conversation, voice commands, or others), hereinafter also called "signal of interest s(t)" or "local signal s" depending on the context, and
- an echo signal z(t), emitted by a sound playback system comprised in the equipment item and composed of one or more loudspeakers HP.

This echo signal is associated with the direct path between the microphone and the playback system, as well as with any reflections of the signal x(t) in the propagation environment.

The overall acoustic path can be modeled by a finite impulse response filter w whose length depends on the characteristics of the propagation environment, such that:

$$z(t)=x(t)*w(t)$$

The operation consisting of removing from the microphone signal y(t) the contribution of the echo signal z(t) is called "acoustic echo cancellation" (or AEC). Processing to perform this operation can consist of deriving an echo signal $\hat{z}(t)$ from the estimation of an acoustic path $\hat{w}(t)$: this operation is called "adaptive filtering". The estimated useful signal $\hat{s}(t)$ is derived by subtracting the estimated echo signal $\hat{z}(t)$ from the microphone signal y(t), as follows:

$$\hat{s}(t)=y(t)-\hat{z}(t)=y(t)-x(t)*\hat{w}(t)$$

Adaptive filtering is generally carried out on the basis of the correlation between the microphone signal and the loudspeaker signal, exploiting the statistical independence between the signal emitted by the loudspeaker x(t) and the signal of interest s(t). In practice, it is appropriate to carry out this processing with a short-term deadline in order to track the changes in the acoustic channel that is represented by the filter w (and for convenience referred to hereinafter as the acoustic path w). These changes can typically manifest themselves when the person speaking is moving through a room which forms said environment.

A result of this short-term processing is that the statistical independence between the signal of interest s(t) and the loudspeaker signal x(t) may no longer hold in certain situations, except for the trivial case where the signal s(t) is zero. Indeed, this independence is no longer true when it is calculated over short windows of time of several tens to hundreds of milliseconds, typically corresponding to a conventional frame length of a digital signal.

The result, in these situations referred to as "double talk", i.e. when the useful signal s(t) is non-zero, is bias in the estimation of the acoustic channel, degrading the echo cancellation. Less complex solutions based on processing that uses a stochastic gradient for example, such as the "Normalized Least Mean Square" (NLMS) technique and its derivatives, are very sensitive to the presence of a local signal s(t). During these double-talk situations, if the filter continues to adapt, it may even diverge and ultimately cause echo amplification, the opposite of the desired effect. Also, to be effective, the adaptive filtering solution must be robust to double-talk situations while being able to quickly track changes in the acoustic path.

Ideally, this filtering should process only the data in play, namely the reference signal x(t) and the microphone signal y(t).

To overcome double-talk situations, certain known adaptive filtering processing solutions implement double-talk detection (DTD) systems. A system of this type is described for example in the reference [@jung2005new] for which the publication details are given in the appendix at the end of this description. Such systems disable adaptation during periods identified as double-talk. However, in practice, DTDs suffer from detection delays, which can lead to echoes. On the other hand, in this specific case of binary decisions, adaptation of the filter is frozen during the double-talk period, which is distracting in practice if the filter has not yet finished converging, resulting in a perceptible residual echo.

Other methods have instead proposed to derive an adaptive step size in the estimation of the acoustic path. In the known references, this step size is continuous. Such implementations make it possible, unlike binary decision approaches such as DTDs, to continue to track the acoustic path, including during periods of double-talk. These types of adaptation are usually derived by frequency bands, as follows:

$$\hat{W}(f,k+1)=\hat{W}(f,k)+\Delta W(f,k)$$

where ΔW is the update at each instant k and at each frequency f of the estimated acoustic channel $\hat{W}(f, k)$.

Working in frequencies makes it possible on the one hand to make the convergence more uniform over the entire frequency range considered. On the other hand, the spectral sparseness of the signals makes it possible to continue to estimate the acoustic channel in one frequency band while freezing the estimate in another. Certain methods, referred to as "Variable Step-Size" or VSS, propose modulating the adaptation ΔW according to different criteria.

It has been attempted to smooth the stochastic adaptation by freezing the iterations deemed to be too random, in particular to avoid random updates due to the presence of double talk.

It has also been attempted to directly measure the local speech presence rate, in the form of a ratio between the energy of the local signal $\hat{\sigma}_y^2(t)$ and that of the echo signal $\hat{\sigma}_z^2(t)$, but this adaptation becomes fixed when this ratio is too high. Since the estimates of the variances $\hat{\sigma}_y^2(t)/\hat{\sigma}_z^2(t)$ are particularly noisy, their direct use in modulating the adaptive step size renders these approaches ineffective in practice: they freeze the adaptation too much, slowing down the speed of convergence, or they limit mismatch insufficiently during the double-talk period.

Other methods are based on an optimal solution of adaptive step size which guarantees a minimal variance of the estimated filter, in view of a minimal echo. This criterion is called "BLUE" for "Best Linear Unbiased Estimate" [@trump1998frequency]. Updating the acoustic path $\Delta W^{(k)}$ in the adaptive filtering process according to this criterion allows limiting the residual echo linked to variations of the adaptive filter around its solution (minimum in variance). However, in practice, the BLUE expression depends on second-order statistics of signal s(t) (and more precisely on its statistical autocorrelation matrix $\Gamma_s$) which are unknown and generally variable over time as is the case for non-stationary signals such as speech typically [@van2007double]. The solution presented in [@trump1998frequency] is therefore not yet fully satisfactory.

SUMMARY

The development improves the situation.

A method is proposed for processing a signal y(t) coming from at least one microphone of an equipment item, the equipment item further comprising at least one loudspeaker intended to be supplied a signal x(t), the processing of said signal y(t) from the microphone:

- aiming at least to limit an echo effect induced by the microphone capturing a sound emitted by the loudspeaker in an environment of the equipment item, said sound emitted by the loudspeaker and any possible acoustic reflections following an acoustic path w(t) from the loudspeaker to the microphone,
- and comprising, in order to limit the echo effect, a determination $\hat{s}(t)$ of a useful signal s(t) by subtracting from the signal y(t) coming from the microphone an estimate of an echo signal $x(t)*\hat{w}(t)$ given by applying a filter $\hat{w}(t)$ to the signal x(t) supplied to the loudspeaker, the filter $\hat{w}(t)$ being adaptive by variable step sizes in order to take into account a change over time of said acoustic path w(t),
- a method wherein:
  - the signal x(t) supplied to the loudspeaker is obtained in the form of a succession over time of frames of signal samples, and
  - the adaptive filter $\hat{w}(t)$ is produced at each frame k of samples as a function of an update $\Delta W^{(k)}$ to the acoustic path w(t) for this frame k and by applying a normalization $\Lambda$ satisfying a criterion chosen for minimal variance, said normalization $\Lambda$ being a function of a parameter representative of a statistical expectation of the useful signal s(t).

Such an implementation offers, as detailed below, an acoustic echo cancellation solution which is robust to double-talk situations in particular.

In one embodiment, the chosen criterion, mentioned above, is of the "BLUE" type, for "Best Linear Unbiased Estimate".

Said statistical expectation can be written $E\{ss^H\}$ in the case of a matrix representation of the useful signal s ($s^H$ designating the conjugate transpose of matrix s). For example, in the time domain and in the case of a representation that is simply scalar, it can depend on a time parameter r, and can be written $E\{s(t)s(t-\tau)\}$.

In the frequency domain, said statistical expectation can be represented by a parameter corresponding to a power spectral density. Thus, in an implementation where the adaptive filter is produced for example in a domain of frequency sub-bands f, its expression can be a function of a parameter corresponding to the power spectral density $\Gamma_s(f)$ of the useful signal s(f). In particular, said normalization $\Lambda(f)$, expressed in the frequency domain, is itself a function of a parameter corresponding to a power spectral density $\Gamma_s$ of the useful signal s.

In such an embodiment, said normalization $\Lambda^{(k)}$ is defined more precisely as a function of the power spectral density $\Gamma_s^{(k)}$ of the useful signal s, and also of the power spectral density $\Gamma_x^{(k)}$ of the signal x supplied to the loudspeaker.

In this embodiment, in a matrix representation where f denotes a row index (and also here a frequency sub-band index) and b a column index, the normalization $\Lambda^{(k)}(f, b)$ can be given by:

$$\Lambda^{(k)}(f, b) = \frac{\mu}{\Gamma_x^{(k)}(f, b) + \gamma\Gamma_s^{(k)}(f, b)},$$

with $\mu \in [0,2[$, and where $\gamma$ is a chosen positive coefficient (this choice can be empirical in the context of a practical implementation).

The power spectral density $\Gamma_s^{(k)}$ of the useful signal s can itself be estimated as a function of a power spectral density $\Gamma_y^{(k)}$ of the signal y captured by the microphone, and of a representation $P_{ESR}^{(k)}$ of an echo-to-signal energy ratio.

In this embodiment, in a matrix representation where f designates a row index and b a column index, the power spectral density $\Gamma_s^{(k)}$ of the useful signal s is given by:

$$\Gamma_s^{(k)}(f, b) = \begin{cases} \dfrac{\Gamma_y^{(k)}(f, b)}{1 + P_{ESR}^{(k)}(f, b)} & \text{if } P_{ESR}^{(k)}(f, b) \le A, \\ \Gamma_s^{(k-1)}(f, b) & \text{if not} \end{cases}.$$

where A is a chosen positive limit (for example a chosen positive term that is "very large" in practice, such as $10^{10}$), and $\Gamma_s^{(k-1)}(f, b)$ is the power spectral density of the useful signal s evaluated for a preceding frame k−1, in a frequency sub-band f and for partition b.

The representation $P_{ESR}^{(k)}$ of the echo-to-signal energy ratio can itself be estimated as a function at least of a power inter-spectral density $\Gamma_{yX}^{(k)}$ between the signal y coming from the microphone and the signal X intended to supply the loudspeaker.

For example, in a matrix representation where f denotes a row index and b a column index, the representation $P_{ESR}^{(k)}$ of the echo-to-signal energy ratio can be given by:

$$P_{ESR}^{(k)}(f, b) = \beta\frac{\Gamma_y^{(k)}(f)}{\Gamma_s^{(k-1)}(f, b)} \cdot \frac{P_{ESR}^{(k-1)}(f, b)}{1 + P_{ESR}^{(k-1)}(f, b)} + (1-\beta)\left(\frac{\Gamma_{yX}^{(k)}(f, b)}{\Gamma_x^{(k)}(f, b)} \cdot \frac{1}{\Gamma_s^{(k-1)}(f, b)}\right),$$

where $\beta$ is a positive forgetting factor that is less than 1, the notation$^{(k-1)}$ referring to an expression determined for a previous frame (k−1).

In this expression, the power inter-spectral density $\Gamma_{yX}^{(k)}$ can be given by:

$$\Gamma_{yX}^{(k)}(f,b)=\begin{cases}\xi\Gamma_{yX}^{(k-1)}(f,b)+(1-\xi)|yX(f,b)|^2 & \text{if } \Gamma_{yX}^{(k-1)}(f,b)\le|yX(f,b)|^2,\\ \left(\delta\sqrt{\Gamma_{yX}^{(k-1)}(f,b)}+(1-\delta)|yX(f,b)|\right)^2 & \text{if not}\end{cases},$$

with $\{\alpha, \delta, \eta, \xi\}\in]0,1]$.

The power spectral densities of the signal that is intended to supply the loudspeaker X and of the signal y coming from the microphone can be given, in a matrix representation where X is a matrix and y a vector, by:

$$\Gamma_x^{(k)}=\alpha\Gamma_x^{(k-1)}+(1-\alpha)|X|^2$$

$$\Gamma_y^{(k)}=\eta\Gamma_y^{(k-1)}+(1-\eta)|y|^2,$$

where $\alpha$ and $\eta$ are forgetting factors greater than 0 and less than 1. Here, the squared norm of a matrix (or vector), denoted $|\bullet|^2$, is defined as the matrix of norms squared for each element of the matrix.

In an embodiment offering advantages for the estimation of the adaptive filter, the latter can be represented by successive partitions. Thus, in such an embodiment, the filter w can be of the finite impulse response type and be N samples long. In particular, it is subdivided into $$B=\frac{N}{L}(B\in\mathbb{N})$$

partitions $w_b$ of L samples each.

In such an embodiment, one can estimate a matrix $W\in\mathbb{C}^{M\times B}$ corresponding to an expression in a transformed domain (for example in the aforementioned domain of frequency sub-bands) of the partitions $w_b$ such that $W=[w_1, \ldots, w_B]$, $w_b\in\mathbb{C}^M$, and representing the filter in the transformed domain, with $w_b=Fw_b$, $F\in\mathbb{C}^{M\times L}$, $M\geq L$, where F is a domain transformation matrix.

One will note that in this embodiment, said column index "b" here can correspond to a partition index $w_b$. Nevertheless, the matrix representation presented above with row indices f and column indices b can be applied to situations other than those involving a partition of the filter. As an immediate illustrative example, the formulas given above remain valid in a degraded embodiment where b=1 for example, which therefore does not involve a partition.

Moreover, for each temporal frame, denoted $x_b\in\mathbb{R}^M$, of M samples of the signal intended to supply the loudspeaker x(t), a matrix $X\in\mathbb{C}^{M\times B}$ is formed representing the signal intended to supply the loudspeaker and corresponding to the transforms of the last B frames $x_b$ such that $X=[x_1, \ldots, x_B]$, $x_b\in\mathbb{C}^M$, with $x_b=Fx_b$. For a temporal frame $y\in\mathbb{R}^L$ of the signal coming from the microphone y(t), a vector $y\in\mathbb{C}^M$ is finally formed.

This vector y can be constructed such that:

$$y=F\begin{bmatrix}0_{M-L}\\ y\end{bmatrix}$$

In this format, the update to the acoustic path $\Delta W^{(k)}$ for a current frame k can then be given by $\Delta w_b^{(k)}=G\Lambda_b^{(k)}\circ x_b^{(k)*}\circ Fe^{(k)}$, where:

"$\circ$" denotes the Hadamard product, $G\in\mathbb{R}^{M\times M}$ is a matrix given by either of the equations:

$$G=FF^H \text{ and } G=I_M,$$

$\Lambda^{(k)}=[\Lambda_1^{(k)} \ldots \Lambda_B^{(k)}]\in\mathbb{R}^{M\times B}$, is a matrix representing the aforementioned normalization, and $e^{(k)}$ is an a priori error estimated from signals x and y for frame k.

The a priori error can be given by:

$$e^{(k)}=\begin{bmatrix}0_{M-L}\\ y^{(k)}\end{bmatrix}-\begin{bmatrix}0_{M-L}\\ 1_L\end{bmatrix}F^H\sum_{b=1}^{B}\left(w_b^{(k)}\circ x_b^{(k)*}\right)$$

In an embodiment where the adaptive filter is updated from a current frame k to a following frame k+1 as a function of an update to the acoustic path $\Delta W^{(k)}$, this update can be estimated for the current frame k, and the update to the acoustic path is given by a relation of the type:

$$W^{(k+1)}=W^{(k)}+\Delta W^{(k)}$$

This description also relates to a computer program comprising instructions for implementing the above method when this program is executed by a processor. In another aspect, a non-transitory, computer-readable storage medium is provided on which such a program is stored.

It also relates to a device for processing a signal y(t) coming from at least one microphone, comprising a processor configured to execute a method as defined above.

BRIEF DESCRIPTION OF THE DRAWINGS

Other features, details, and advantages will become apparent upon reading the detailed description below, and upon analyzing the appended drawings, in which.

DETAILED DESCRIPTION OF CERTAIN EMBODIMENTS

The drawings and the description below for the most part contain elements that are certain in nature. They therefore not only serve to provide a better understanding of this disclosure, but where applicable they also contribute to its definition.

This description hereinafter proposes an acoustic echo cancellation solution that is robust to double-talk situations. It is based on processing that involves adaptive filtering, for example NLMS processing, typically applied successively to each frame of a succession of frames. Frame is understood here to mean a given number of successive samples of the signal supplied to the loudspeaker x(t), this signal of course being presumed to be digital.

In one embodiment, the filter used for the adaptive filtering is partitioned (the length of each partition may or may not correspond to the length of a frame), preferably in the frequency domain (technique referred to here as "Partitioned-Block Frequency Domain NLMS" or "PBFD- NLMS"). A technique of this type is presented for example in the reference [@borrallo1992implementation].

More particularly here, the solution is based on a derivation of the BLUE optimal step size, but estimates the necessary statistics directly from the reference and microphone signals without adding auxiliary information. This makes it possible to calculate $\Delta W^{(k)}$ without an error prediction model or a priori error prediction model on the acoustic path, as may be the case in the references of the prior art, in particular [@gil2014frequency].

Such an embodiment guarantees, without auxiliary information other than that inferred directly by the processing itself, both a convergence that is close to optimum in the sense of speed of convergence, zero bias at convergence, and an absence of divergence in double-talk situations.

Adaptive filtering, when expressed in the frequency domain, makes it possible in particular to control and normalize the updating of the acoustic path independently of the frequency band involved. Thus, in addition to reduced complexity, the solution benefits from a more uniform convergence over the entire frequency range considered.

Its operation via partitioning, associated with filtering in the frequency domain, also makes it possible to estimate in each iteration of the processing a time-frequency representation $W^{(k)}$ of the acoustic path w. This makes it possible to implement different adaptation strategies according to the partitions. It also makes it possible to guarantee better convergence in the case of very long filters.

Such processing allows deriving a step size which optimizes both the behavior in a double-talk situation and the acoustic channel tracking.

Figure 2:
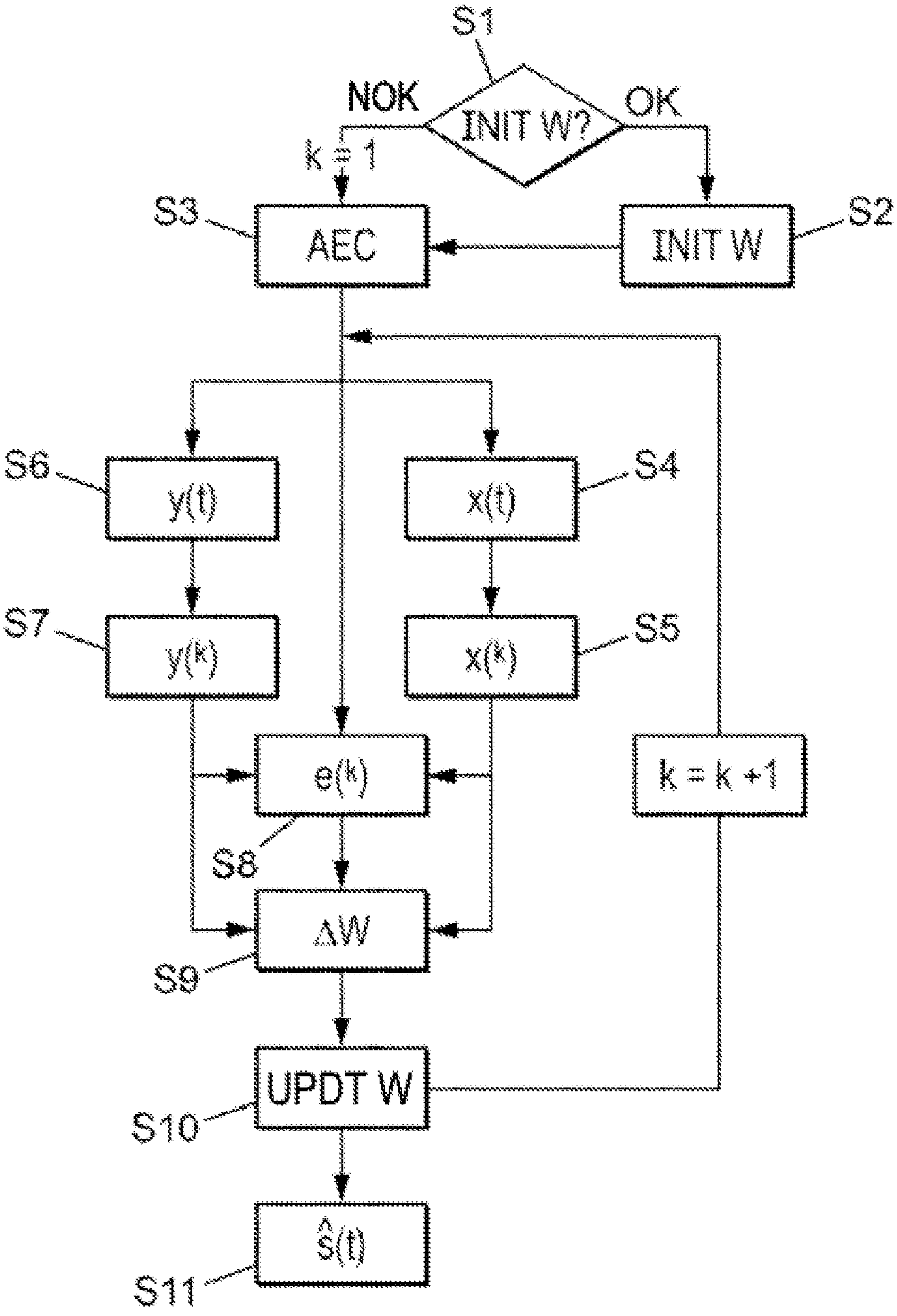
FIG. 2 shows processing according to one embodiment, in order to deliver the aforementioned useful signal.

FIG. 2 shows the different steps of the adaptive filtering solution. In each iteration of the adaptive filtering processing, a frame of L new samples of signals x(t) and y(t) is considered and L new samples of ŝ(t) are produced. In step S1, it is determined whether it is necessary to initialize the acoustic path to be considered (for example at the start of a conversation between a speaker and another party), in which case the initialization of the acoustic path takes place in step S2. Otherwise, in step S3, the acoustic echo cancellation AEC processing is directly begun. In step S4, a temporal frame of the reference signal x(t) is retrieved and, in the example described, a projection is applied to it in the frequency domain (for example in the domain of the frequency sub-bands) in step S5 to obtain a frequency representation $x^{(k)}$. Similar processing is performed with each temporal frame of the microphone signal y(t) (step S6) to obtain a projection $y^{(k)}$ in the frequency domain in step S7. On the basis of frames x(t) and y(t) (or as described herein, on the basis of their frequency representation), echo cancellation processing is applied in step S8 in order to estimate an a priori error $e^{(k)}$, as follows.

An embodiment of an adaptive filtering for echo cancellation is described below by producing the filter by partitions according to the "partitioned-block" technique.

Considering a target acoustic path modeled by a finite impulse response filter w(t) with a length of N samples and split into $$B = \frac{N}{L}(B \in \mathbb{N}^*)$$

partitions $w_b \in \mathbb{R}^L$, we can estimate the matrix $W \in \mathbb{C}^{M \times B}$ corresponding to the frequency transforms of the partitions $w_b$ such that:

$$W = [w_1, \ldots, w_B], w_b \in \mathbb{C}^M, \text{ with } w_b = F w_b, F \in \mathbb{C}^{M \times L}, M \geq L.$$

F is the domain transformation matrix, for example here the redundant discrete Fourier transform (DFT) matrix such that each element is characterized by:

$$F_{ml} = e^{\left(-j\frac{2\pi ml}{M}\right)}.$$

In practice, redundancy is achieved by padding with zeros in the time domain.

In the same manner, we consider $x_b \in \mathbb{R}^M$ a temporal frame containing M samples of the reference signal x(t) and we form the matrix $X \in \mathbb{C}^{M \times B}$ corresponding to the frequency transforms of the last B frames $x_b$ such that:

$$X = [x_1, \ldots, x_B], x_b \in \mathbb{C}^M, \text{ with } x_b = F x_b.$$

By further considering a temporal frame $y \in \mathbb{R}^L$ of the microphone signal y(t), we can denote the vector $y \in \mathbb{C}^M$ such that:

$$y = F\begin{bmatrix} 0_{M-L} \\ y \end{bmatrix}$$

To avoid the problems associated with convolution operations carried out in the frequency domain, the processing is based on an overlap-save operation (OLS). Here, the exponent $\bullet^{(k)}$ reflects the k-th iteration of the processing. After initialization of $W^{(0)}$, $X^{(0)}$, $y^{(0)}$ and the other characteristics, the processing can continue by calculating the a priori error $e^{(k)} \in \mathbb{R}^M$:

$$e^{(k)} = \begin{bmatrix} 0_{M-L} \\ y^{(k)} \end{bmatrix} - \begin{bmatrix} 0_{M-L} \\ 1_L \end{bmatrix} F^H \sum_{b=1}^{B} \left(w_b^{(k)} \circ x_b^{(k)*}\right)$$

where "○" here denotes the Hadamard product, and $(\bullet)^*$ the conjugate of a matrix or of a vector.

As indicated above, the redundancy of the DFT is achieved by means of zero-padding which is found in the expression of the a priori error and which advantageously makes it possible to avoid an artifact due to a circular convolution.

The method then continues with calculating the update to the acoustic path $\Delta W^{(k)} = [\Delta w_1^{(k)} \ldots \Delta w_B^{(k)}] \in \mathbb{C}^{M \times B}$ in step S9, as follows:

$$\Delta w_b^{(k)} = G \Lambda_b^{(k)} \circ x_b^{(k)*} \circ F e^{(k)}, \text{ with } \Lambda^{(k)} = [\Lambda_1^{(k)} \ldots \Lambda_B^{(k)}] \in \mathbb{R}^{M \times B}, G \in \mathbb{R}^{M \times M}$$

In an embodiment where the update is optimal (thanks to zero-padding), we set $G = FF^H$ (called a "constrained" update).

In an embodiment where the update is sub-optimal, we can instead set $G = I_M$ (update referred to as "non-constrained"). Such an implementation has the advantage of consuming fewer resources.

Step S10 then aims to calculate $W^{(k+1)}$ in order to update the acoustic path:

$$W^{(k+1)} = W^{(k)} + \Delta W^{(k)}$$

And in step S11, the useful signal $\hat{s}(t) = y(t) - x(t) * \hat{w}(t)$ is obtained after convolution of $x^{(k)}$ by $W^{(k)}$ and brought back to the time domain.

Figure 3:
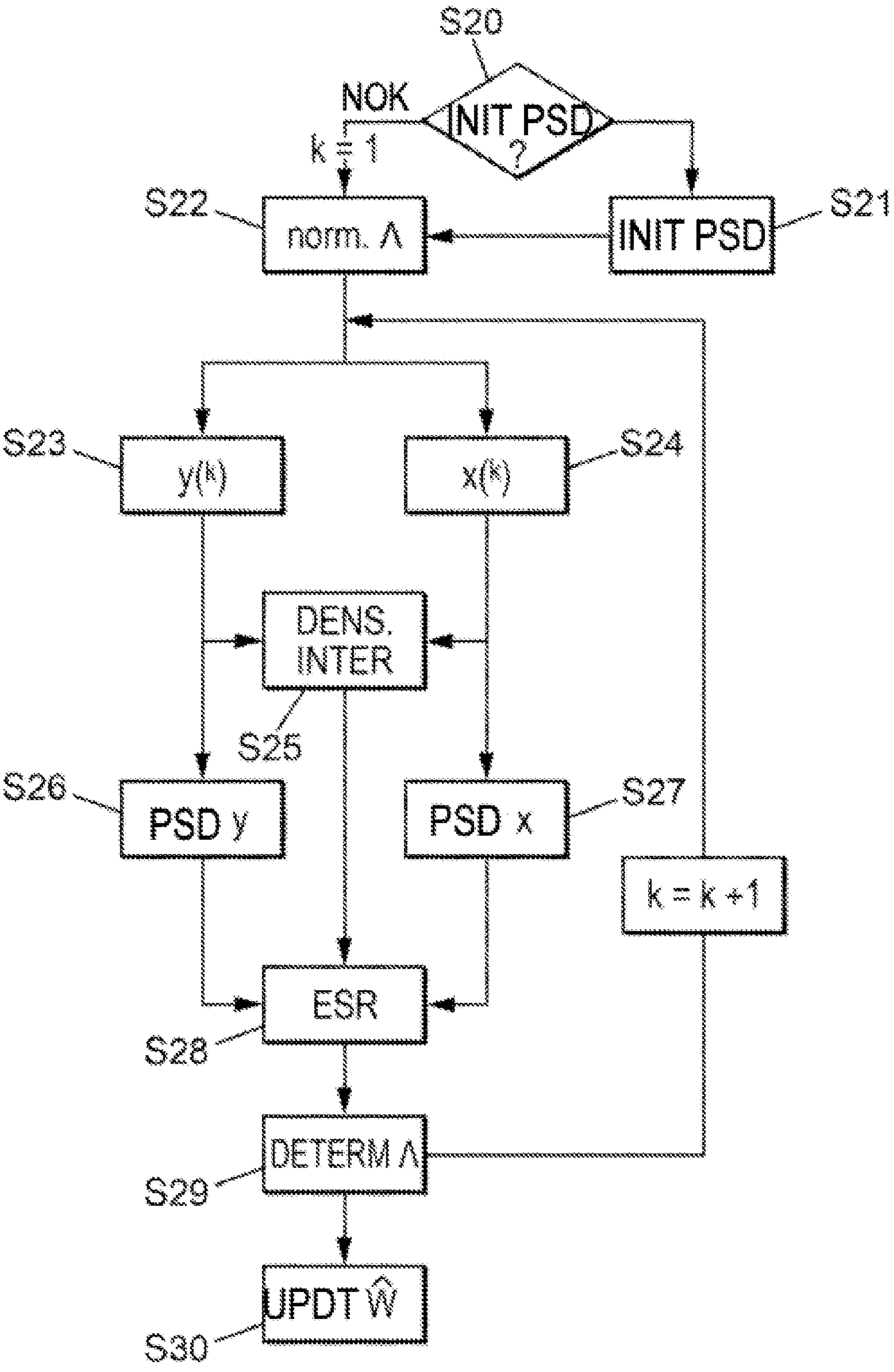
FIG. 3 shows processing according to one embodiment, in order to deliver an update of the estimate of the aforementioned acoustic path.

FIG. 3 details the step of calculating the update to the acoustic path $W^{(k)}$, in particular the optimal normalization term A allowing the robustness intrinsic to double-talk situations.

For the echo cancellation solution to be robust in the situations described above a spectral normalization term $\Lambda^{(k)}$ is chosen which satisfies the BLUE criterion. This can be achieved due to knowing the power spectral densities (PSD) of the microphone signal x(t) and of the local signal s(t).

In reference [@van2007double], BLUE is obtained at the cost of strong assumptions about the local signal which must accept an autoregressive model, considered to be speech, and the use of an error prediction method. On the other hand, [@trump1998frequency] achieves BLUE by estimating the PSD of the local signal after the fact by means of the error signal only $e^{(k)}$, doing so at the cost of less stability and also operating with strong constraints on the local signal (stationary colored noise).

The proposed solution, explained below, overcomes the constraints used above due to a robust estimation of the DSPs over time.

Assuming:

- $\Gamma_x=[\Gamma_{x_1} \ldots \Gamma_{x_B}]\in \mathbb{R}^{M\times B}$ (resp. $\Gamma_y\in \mathbb{R}^{M}$) the power spectral density (PSD) estimate of X for each frequency and each partition (resp. of y for each frequency) and
- the inter-spectrum of the microphone signal and of the reference signal $yX=[y\circ x_1 \ldots y\circ x_B]\in \mathbb{C}^{M\times B}$ and its power inter-spectral density $\Gamma_{yX}=E\{yX\}\in \mathbb{C}^{M\times B}$,
- the power spectral density of the local signal s for each frequency and each partition is designated as $\Gamma_s\in \mathbb{R}^{M\times B}$.

Finally, we denote as $P_{ESR}\in \mathbb{R}^{M\times B}$ (ESR for "Echo-to-Signal Ratio") the matrix expressing, for each frequency band and each partition, the ratio of the energies of the echo and of the local signal. After initialization of $\Gamma_x^{(0)}$, $\Gamma_y^{(0)}$, $\Gamma_{yX}^{(0)}$, $\Gamma_s^{(0)}$, $P_{ESR}^{(0)}$, and of other characteristics, the processing performs the following operations:

Estimation of power spectral densities (PSD):

$$\Gamma_{x_b}^{(k)} = \alpha\Gamma_{x_b}^{(k-1)} + (1-\alpha)|x_b|^2, \quad \text{where } |x_b|^2 = \begin{bmatrix} |x_b(1)|^2 \\ \vdots \\ |x_b(M)|^2 \end{bmatrix}$$

$$\Gamma_{y}^{(k)} = \eta\Gamma_{y}^{(k-1)} + (1-\eta)|y|^2, \quad \text{where } |y|^2 = \begin{bmatrix} |y(1)|^2 \\ \vdots \\ |y(M)|^2 \end{bmatrix}$$

$$\Gamma_{yX}^{(k)}(f,b) = \begin{cases} \xi\Gamma_{yX}^{(k-1)}(f,b) + (1-\xi)|yX(f,b)|^2 & \text{if } \Gamma_{yX}^{(k-1)}(f,b) \le |yX(f,b)|^2, \\ \left(\delta\sqrt{\Gamma_{yX}^{(k-1)}(f,b)} + (1-\delta)|yX(f,b)|\right)^2 & \text{if not} \end{cases},$$

with $\{\alpha, \delta, \eta, \xi\}\in ]0,1]$

Estimation of instantaneous Echo-to-Signal ratio (ESR):

$$P_{ESR}^{(k)}(f,b) = \beta\frac{\Gamma_y^{(k)}(f)}{\Gamma_s^{(k-1)}(f,b)} \circ \frac{P_{ESR}^{(k-1)}(f,b)}{1+P_{ESR}^{(k-1)}(f,b)} + (1-\beta)\left(\frac{\Gamma_{yX}^{(k)}(f,b)}{\Gamma_x^{(k)}(f,b)} \circ \frac{1}{\Gamma_s^{(k-1)}(f,b)}\right),$$

with $\beta\in ]0,1]$.

Estimation of normalization $\Lambda^{(k)}$:

$$\Gamma_s^{(k)}(f,b) = \begin{cases} \dfrac{\Gamma_y^{(k)}(f)}{1+P_{ESR}^{(k)}(f,b)} & \text{if } P_{ESR}^{(k)}(f,b) \le 10^{10}, \\ \Gamma_s^{(k-1)}(f,b) & \text{if not} \end{cases}.$$

Then, by applying the method within the meaning of this description, the normalization parameter, in order to satisfy the BLUE criterion, is expressed by:

$$\Lambda^{(k)}(f,b) = \frac{\mu}{\Gamma_x^{(k)}(f,b) + \gamma\Gamma_s^{(k)}(f,b)}, \quad \gamma\in\mathbb{R}^+,$$

with $\mu\in [0,2[$.

This last expression of the normalization parameter involves the term $\Gamma_s^{(k)}$ which is a function of the estimation of the echo-to-signal ratio which ultimately can be the only parameter (with of course the signal x(t)) to be estimated within the meaning of this description, for each frame k.

It should be noted that otherwise, by applying instead the teachings of the state of the art as described for example in [@borrallo1992implementation] to implement the classic technique of PBFD-NLMS, the normalization parameter of the filter would then be expressed as follows:

$$\Lambda^{(k)}(f,b) = \frac{\mu}{|x_b(f)|^2},$$

with $\mu\in [0,2[$, without involving any measurement for an estimation of the echo-to-signal ratio.

Now by taking the steps of FIG. 3, the first step S20 begins with a test to determine whether to initialize the power spectral density estimates. If such is the case, in step S21 the respective spectral densities of the signal from the microphone y and of the reference signal x are initialized. Otherwise, the procedure for estimating the spectral normalization factor A is launched directly in step S22. In step S23, the current frequency frame of the microphone signal is retrieved and in step S24 the current frequency frame of the reference signal is retrieved, in order to estimate in step S25 the aforementioned inter-spectral density. Then, in step S26, the power spectral density of the microphone signal is estimated, and in step S27, the power spectral density of the reference signal is estimated, in order to deduce therefrom, as described above, an estimate of the instantaneous Echo-to-Signal ratio (ESR) in step S28. An estimate of the spectral normalization factor $\Lambda^{(k)}$ is deduced from this in step S29, from which the update to the acoustic path can be determined in step S30: $\Delta w_b^{(k)}=G\Lambda_b^{(k)}\circ x_b^*\circ Fe^{(k)}$ $$\hat{w}\in \mathbb{R}^{N\times 1}\ \hat{w}=\operatorname{argmin}_w((y-w^Tx)R_s^{-1}(y-w^Tx)^T),$$

Achieving the BLUE criterion with adaptive filtering performed in the time domain generally amounts to finding a solution such that:

$$\hat{w}\in \mathbb{R}^{N\times 1}\ \hat{w}=\operatorname{argmin}_w((y-w^Tx)R_s^{-1}(y-w^Tx)^T),$$

where $y\in \mathbb{R}^{1\times M}$ is the microphonic signal vector, $$x = \begin{bmatrix} x(t) & \ldots & x(t-M+1) \\ \vdots & \ddots & \vdots \\ x(t-N+1) & \ldots & x(t-M-N+2) \end{bmatrix} \in \mathbb{R}^{N\times M}$$

is the matrix of the loudspeaker signal, and $R_s \in \mathbb{R}^{M\times M}$ is the autocorrelation matrix of the signal s.

Current echo cancellation methods are based on adaptive filtering in the frequency domain. The approach presented in [@trump1998frequency] proposes achieving a regularized version of the BLUE criterion by looking for an acoustic channel w solution in the frequency domain such that:

$$\hat{w}=\mathrm{argmin}_w((y-w\circ x^*)^H(\lambda\Gamma_s+\Gamma_x)^{-1}(y-w\circ x^*)),$$

where $\Gamma_s$ (resp. $\Gamma_x$) is the diagonal matrix of the power spectral density of signal s (resp. x).

However, the local signal s is not known. The estimator satisfying the BLUE criterion is then, in practice, very difficult to obtain without other information or a model on s.

A solution as described in [@borrallo1992implementation] can only produce an unbiased estimate (thus satisfying the BLUE criterion) of the acoustic channel $\hat{W}$ if the local signal s and the reference signal x are decorrelated, i.e. $E\{Xs^T\}=0$ (with $E\{\bullet\}$ representing the expectation operator). In practice, this condition can only be met if the signal s is white noise. In all other situations, in order to reach an unbiased estimate $\hat{W}$, it is necessary to add to the denominator of the normalization factor $\Lambda^{(k)}$ a fraction of the variance of the local signal s, i.e. $E\{ss^H\}$ or its power spectral density (PSD) in the frequency domain (which takes the form of the parameter $\Gamma_s \in \mathbb{R}^{M\times B}$ in the equations presented above).

As the expectation $E\{ss^H\}$ is unknown, the solution proposed here overcomes the constraints used above due to a robust estimation over time of the power spectral densities, and in particular of the one which occurs in the denominator cited above: $\Gamma_s$, the power spectral density of the local signal s.

The processing as described above can be used in particular in situations where it is necessary to capture sound and play it back simultaneously. The most common use cases are hands-free telephony (the person speaking at a distance hears his or her own delayed voice—the echo—mixed in with the voice of the other party), interactions with voice assistants (responses from the dialogue system and/or the music played on the voice assistant being mixed in with the commands issued by the user and interfering with voice recognition), intercoms, video-conferencing systems, and others.

Figure 1:
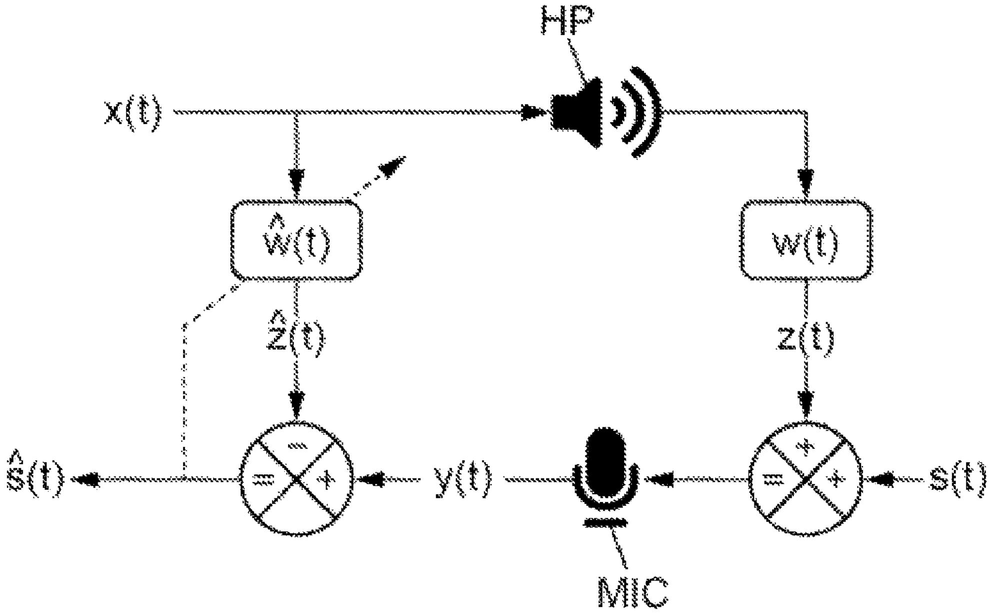
FIG. 1 shows an equipment item in which the object of this description can be implemented, according to one embodiment.
Figure 4:
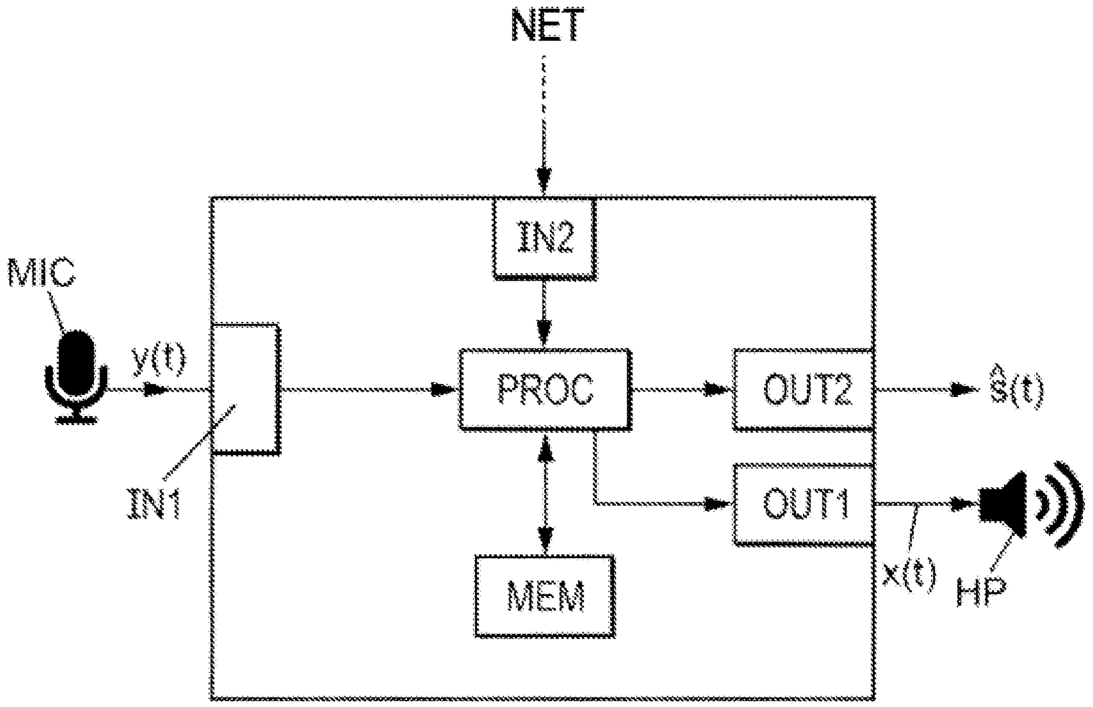
FIG. 4 shows a device for implementing the object of this description, according to one embodiment.

A device for implementing the above method is represented in FIG. 4, which can also be illustrated by the two modules on the left in FIG. 1 (adaptive filtering and subtraction applied to the signal y(t) captured by the microphone). With reference to FIG. 4, this device can typically comprise a first input interface IN1 for receiving the signal y(t) acquired from the microphone MIC, as well as a second input interface IN2, which in the example represented is for receiving a signal (for example a telecommunications signal, such as a voice or music signal) to be played back on a loudspeaker HP. The device comprises a processor PROC capable of cooperating with a memory MEM in order to process this audio signal and deliver, via a first output interface OUT1 comprised in the device, the signal x(t) intended to supply the loudspeaker HP. In particular, the memory MEM stores at least instruction data of a computer program according to one aspect of this description, the instruction data being readable by the processor PROC in order to execute the processing described above and apply it in particular to the signal from the microphone y(t) in order to deliver a useful signal s(t) via a second output interface OUT2 comprised in the device in one exemplary embodiment.

Of course, this is an exemplary embodiment, where typically here the useful signal s(t) can be transmitted via the output interface OUT2 to a remote party for example. In this case, interface OUT2 can be connected to a communication antenna or to a router of a telecommunications network NET for example. The same is true for the input interface IN2 receiving "from the outside" a signal to be played over the loudspeaker.

In a device such as a voice assistant for example, it is typically possible to also be in a double-talk situation when the user is speaking voice commands at the same time as the assistant is responding for example to previous commands. In this case, at least part of the responses of the voice assistant can be issued locally from the content of the memory MEM for example without having to make use of a remote server and a telecommunications network. In addition, the useful signal s(t) can be locally interpreted only by the processor PROC in order to respond to voice commands from the user. Interfaces IN2 and OUT2 thus may not be necessary.

A typical use case for the processing referred to as "double-talk" processing with a voice assistant consists, for example, of listening to music through the loudspeaker of the voice assistant, while the user is speaking a command to wake up the assistant (WakeUpWord). In this case, it is advisable to eliminate the playing music x(t)*w(t) from the sound signal y(t) captured in an environment (with its reverberations) in which the assistant has just been placed, in order to be able to detect correctly the command signal actually spoken s(t).

Of course, the development is not limited to the embodiment presented above, and may extend to other variants.

For example, a practical embodiment was described above in which the signals are processed in the domain of the frequency sub-bands. Nevertheless, the development can alternatively be implemented in the time domain by exploiting a parameter such as the expectation $E\{ss^T\}$ equivalent to the power spectral density $\Gamma_s$ of the local signal s in the frequency domain.

Consequently, the aforementioned estimates of power spectral densities can effectively be carried out in one possible but not necessary implementation.

The same is true for the adaptive filter partition, which can also work in the sub-band domain but this is not necessary either.

Furthermore, in FIG. 4, a compact equipment item has been shown comprising the echo cancellation device (which can thus be illustrated by the processor PROC, the memory MEM, and at least one input interface and at least one output interface), as well as the microphone MIC and the loudspeaker HP. In a variant embodiment, the device on the one hand and one or more microphones and one or more loudspeakers on the other hand can be located at different sites, connected by a telecommunications network for example or a local area network (powered by a home gateway), or other means.

APPENDIX: REFERENCES

[@borrallo1992implementation]: Borrallo, J. P., & Otero, M. G. (1992). On the implementation of a partitioned block frequency domain adaptive filter (PBFDAF) for long acoustic echo cancellation. Signal Processing, 27(3), 301-315.

[@trump1998frequency]: Trump, T. (1998, May). A frequency domain adaptive algorithm for colored measurement noise environment. In Proceedings of the 1998 IEEE International Conference on Acoustics, Speech and Signal Processing, ICASSP'98 (Cat. No. 98CH36181) (Vol. 3, pp. 1705-1708). IEEE.

[@jung2005new]: Jung, H. K., Kim, N. S., & Kim, T. (2005). A new double-talk detector using echo path estimation. Speech communication, 45(1), 41-48.

[@van2007double]: Van Waterschoot, T., Rombouts, G., Verhoeve, P., & Moonen, M. (2007). Double-talk-robust prediction error identification algorithms for acoustic echo cancellation. IEEE Transactions on Signal Processing, 55(3), 846-858.

[@gil2014frequency]: Gil-Cacho, J. M., Van Waterschoot, T., Moonen, M., & Jensen, S. H. (2014). A frequency-domain adaptive filter (FDAF) prediction error method (PEM) framework for double-talk-robust acoustic echo cancellation. IEEE/ACM Transactions on Audio, Speech, and Language Processing, 22(12), 2074-2086.

The invention claimed is:

1. A method of processing a signal y(t) coming from at least one microphone of an equipment item, the equipment item further comprising at least one loudspeaker intended to be supplied a signal x(t), the processing of the signal y(t) from the microphone comprising:

at least partially limiting an echo effect induced by the microphone capturing a sound emitted by the loudspeaker in an environment of the equipment item, the sound emitted by the loudspeaker and any possible acoustic reflections following an acoustic path w from the loudspeaker to the microphone, and comprising, in order to limit the echo effect, a determination $\hat{s}(t)$ of a useful signal s(t) by subtracting from the signal y(t) coming from the microphone an estimate of an echo signal $x(t)*\hat{w}(t)$ given by applying a filter $\hat{w}(t)$ to the signal x(t) supplied to the loudspeaker, the filter $\hat{w}(t)$ being adaptive by variable step size in order to take account of a change over time of the acoustic path w(t), the method wherein:

the signal x(t) supplied to the loudspeaker is obtained in the form of a succession over time of frames of signal samples, and the adaptive filter $\hat{w}(t)$ is produced at each frame k of samples as a function of an update $\Delta W^{(k)}$ to the acoustic path w(t) for this frame k and by applying a normalization Λ satisfying a criterion chosen for minimal variance, the normalization Λ being a function of a parameter representative of a statistical expectation of the useful signal s(t).

2. The method according to claim 1, wherein the chosen criterion is of the "BLUE" type, for "Best Linear Unbiased Estimate".

3. The method according to claim 1, wherein the adaptive filter is produced in a domain of frequency sub-bands f, and the normalization Λ is a function of a parameter corresponding to a power spectral density $\Gamma_s$ of the useful signal s.

4. The method according to claim 3, wherein the normalization $\Lambda^{(k)}$ is defined as a function of:

the power spectral density $\Gamma_s^{(k)}$ of the useful signal s, and the power spectral density $\Gamma_x^{(k)}$ of the signal x supplied to the loudspeaker.

5. The method according to claim 4, wherein, in a matrix representation where f denotes a row index and b a column index, the normalization $\Lambda^{(k)}(f, b)$ is given by:

$$\Lambda^{(k)}(f, b) = \frac{\mu}{\Gamma_x^{(k)}(f, b) + \gamma\Gamma_s^{(k)}(f, b)},$$

with $\mu \in [0,2[$, and where γ is a chosen positive coefficient.

6. The method according to claim 4, wherein the power spectral density $\Gamma_s^{(k)}$ of the useful signal s is estimated as a function of a power spectral density $\Gamma_y^{(k)}$ of the signal y captured by the microphone, and of a representation $P_{ESR}^{(k)}$ of an echo-to-signal energy ratio.

7. The method according to claim 6, wherein, in a matrix representation where f denotes a row index and b a column index, the power spectral density $\Gamma_s^{(k)}$ of the useful signal s is given by:

$$\Gamma_s^{(k)}(f, b) = \begin{cases} \dfrac{\Gamma_y^{(k)}(f, b)}{1 + P_{ESR}^{(k)}(f, b)} & \text{if } P_{ESR}^{(k)}(f, b) \le A, \\ \Gamma_s^{(k-1)}(f, b) & \text{if not} \end{cases}.$$

where A is a chosen positive limit, and $\Gamma_s^{(k-1)}(f, b)$ is the power spectral density of the useful signal s evaluated for a preceding frame k−1, in a frequency sub-band f and for partition b.

8. The method according to claim 6, wherein the representation $P_{ESR}^{(k)}$ of the echo-to-signal energy ratio is estimated as a function at least of a power inter-spectral density $\Gamma_{yX}^{(k)}$ between the signal y coming from the microphone and the signal X intended to supply the loudspeaker.

9. The method according to claim 8, wherein, in a matrix representation where f denotes a row index and b a column index, the representation $P_{ESR}^{(k)}$ of the echo-to-signal energy ratio is given by:

$$P_{ESR}^{(k)}(f, b) = \beta\frac{\Gamma_y^{(k)}(f)}{\Gamma_s^{(k-1)}(f, b)} \cdot \frac{P_{ESR}^{(k-1)}(f, b)}{1 + P_{ESR}^{(k-1)}(f, b)} + (1 - \beta)\left(\frac{\Gamma_{yX}^{(k)}(f, b)}{\Gamma_x^{(k)}(f, b)} \cdot \frac{1}{\Gamma_s^{(k-1)}(f, b)}\right),$$

where β is a positive forgetting factor that is less than 1, the notation$^{(k-1)}$ referring to an expression determined for a previous frame (k−1).

10. The method according to claim 9, wherein the power inter-spectral density $\Gamma_{yX}^{(k)}$ is given by:

$$\Gamma_{yX}^{(k)}(f, b) = \begin{cases} \xi\Gamma_{yX}^{(k-1)}(f, b) + (1 - \xi)|yX(f, b)|^2 & \text{if } \Gamma_{yX}^{(k-1)}(f, b) \le |yX(f, b)|^2, \\ \left(\delta\sqrt{\Gamma_{yX}^{(k-1)}(f, b)} + (1 - \delta)|yX(f, b)|\right)^2 & \text{if not} \end{cases},$$

with $\{\alpha, \delta, \eta, \xi\} \in ]0,1]$.

11. The method according to claim 9, wherein the power spectral densities of:

the signal intended to supply the loudspeaker, represented by a matrix X, and the signal coming from the microphone, represented by a vector y, are given respectively by:

$$\Gamma_x^{(k)} = \alpha\Gamma_x^{(k-1)} + (1-\alpha)|X|^2, \text{ and}$$

$$\Gamma_y^{(k)} = \eta\Gamma_y^{(k-1)} + (1-\eta)|y|^2,$$

where α and η are forgetting factors greater than 0 and less than 1.

12. The method according to claim 1, wherein the adaptive filter is a finite impulse response filter w that is N samples long and is subdivided into $$B = \frac{N}{L}(B \in \mathbb{N})$$

partitions $w_b$ of L samples each.

13. The method according to claim 12, wherein one estimates a matrix $W \in \mathbb{C}^{M \times B}$ corresponding to an expression in a transformed domain of the partitions $w_b$ such that $W=[w_1, \ldots, w_B]$, $w_b \in \mathbb{C}^M$, and representing the filter in the transformed domain, with $w_b = Fw_b$, $F \in \mathbb{C}^{M \times L}$, M≥L, where F is a domain transformation matrix, and wherein, for each temporal frame, denoted $x_b \in \mathbb{R}^M$, of M samples of the signal intended to supply the loudspeaker x(t), a matrix $X \in \mathbb{R}^{M \times B}$ is formed corresponding to the transforms of the last B frames $x_b$ such that $X=[x_1, \ldots, x_B]$, $x_b \in \mathbb{C}^M$, with $x_b = Fx_b$, and for a temporal frame $y \in \mathbb{R}^L$ of the signal coming from the microphone y(t), a vector $y \in \mathbb{C}^M$ is formed.

14. The method according to claim 13, wherein the vector y is such that:

$$y = F\begin{bmatrix} 0_{M-L} \\ y \end{bmatrix}.$$

15. The method according to claim 13, wherein the update to the acoustic path $\Delta W^{(k)}$ for a current frame k is given by $\Delta w_b^{(k)} = G\Lambda_b^{(k)} \circ x_b^{(k)*} \circ Fe^{(k)}$, where:

"∘" denotes the Hadamard product, $G \in \mathbb{R}^{M \times M}$ is a matrix given by either of the equations:

$G=FF^H$ and $G=I_M$, $\Lambda^{(k)}=[\Lambda_1^{(k)} \ldots \Lambda_B^{(k)}] \in \mathbb{R}^{M \times B}$, is a matrix representing the aforementioned normalization, and $e^{(k)}$ is an a priori error estimated from signals x and y for frame k.

16. The method according to claim 15, wherein the a priori error is given by:

$$e^{(k)} = \begin{bmatrix} 0_{M-L} \\ y^{(k)} \end{bmatrix} - \begin{bmatrix} 0_{M-L} \\ 1_L \end{bmatrix} F^H \sum_{b=1}^{B} \left(w_b^{(k)} \circ x_b^{(k)*}\right).$$

17. The method according to claim 1, wherein the adaptive filter is updated from a current frame k to a following frame k+1 as a function of an estimated update to the acoustic path $\Delta W^{(k)}$ for the current frame k, according to a relation of the type: $W^{(k+1)}=W^{(k)}+\Delta W^{(k)}$.

18. A non-transitory computer storage medium, storing instructions of a computer program causing implementation of the method according to claim 1 when this computer program is executed by a processor.

19. A device for processing a signal y(t) coming from at least one microphone, and comprising a processor configured to execute the method according to claim 1.

* * * * *